July 21, 1953   C. GRANET ET AL   2,646,136
DOUBLE-ACTING HYDRAULIC PISTON SHOCK ABSORBER
Filed Jan. 9, 1950   3 Sheets-Sheet 1

INVENTORS
CHARLES GRANET
MAURICE HELBIG

July 21, 1953 C. GRANET ET AL 2,646,136
DOUBLE-ACTING HYDRAULIC PISTON SHOCK ABSORBER
Filed Jan. 9, 1950 3 Sheets-Sheet 2

INVENTORS
CHARLES GRANET
MAURICE HELBIG

July 21, 1953 C. GRANET ET AL 2,646,136
DOUBLE-ACTING HYDRAULIC PISTON SHOCK ABSORBER
Filed Jan. 9, 1950 3 Sheets-Sheet 3

INVENTORS
CHARLES GRANET
MAURICE HELBIG

UNITED STATES PATENT OFFICE 2,646,136

DOUBLE-ACTING HYDRAULIC PISTON SHOCK ABSORBER

Charles Granet, Courbevoie, and Maurice Helbig, Paris, France

Application January 9, 1950, Serial No. 137,616
In France January 22, 1949

9 Claims. (Cl. 188—88)

Use is made, particularly in the motor-car industry for the suspension of bodyworks, of hydraulic double-acting piston shock-absorbers comprising a body secured to one of the spring-interconnected elements and forming a horizontal cylinder, in which a double-acting piston is movable from one to the other side of an intermediate transverse plane under the action of a rocking finger carried by a pivot shaft provided with an external lever connected with the other element.

The present invention has for its object to provide improvements in shock-absorbers of that type, which considerably simplify manufacture thereof and make it possible to obtain low cost prices, while at the same time improving the conditions of operation, both as concerns the centering of the sliding piston and the wear therein, as well as the shock-absorbing effect in both directions of the piston's displacement.

According to a feature of the invention, the piston, provided with symmetrical heads, comprises within each head a check-valve adapted to suck in reserve liquid toward the end of the cylinder, while the return of the liquid from both ends of the cylinder to the supply is effected through a common duct provided with a single loaded return-valve, said duct connected with channels provided with check-valves formed in the body and connecting said duct with the ends of the cylinder.

According to another feature, the piston is formed of a free-cut steel tube partitioned by seating discs for the intake valves and their springs.

According to another feature, the piston is traversed from end to end by a rod coaxial with the cylinder serving as a guide for the intake valves and supported at its ends by plugs sealing the ends of the cylinder.

Like the majority of known shock-absorbers, said apparatus starts producing its damping effect at the very start of the piston's stroke, the braking action at once assuming a value predetermined by the load of the return valve, with however the following peculiarity, viz. that since said valve is common to the return of the liquid from both ends of the cylinder, the braking produced by that pressure remains the same regardless of the direction of the stroke.

It has been attempted, as is known, to cause the braking or retarding force to vary throughout the stroke in order to confer greater flexibility to the suspension; and devices are known which allow attenuation of the retardation in the vicinity of the position of balance, until the time the piston has moved by a certain amount corresponding with a substantial deflection of the suspension springs. It is known however that the balance position is variable depending on the greater or lesser degree to which the suspended vehicle is loaded and the reciprocations of the piston are effected about this variable position of balance. In order to maintain the same damping effect from any balance position wherever the latter may be, it has been suggested to control the reduction in pressure at the start by means of a slide-block free to move parallel with the axis of the cylinder and maintained in stable position by pressures exerted on both ends of said slide-block and corresponding at each cylinder end, with the integral of the variable pressures that prevail at that end of the cylinder.

The present invention also has for its object to provide a shock-absorber comprising a device of such type, which makes it possible to suppress the braking action during normal outward strokes while restoring it during the return strokes, and impart to it a reduced value in the vicinity of the position of equilibrium, and adapted to conform itself to any variations in said position.

According to another feature of the invention, the axial rod in the cylinder is shorter than the cylinder, so as to be slidable in its supports secured to the end plugs under the action of the pressure prevailing in the space at the ends of said rod, in communication with the cylinder end through metered leakage orifices, and it is provided with collars forming annular leakage passages for the liquid between the rod and the intake valve throughout the major portion of the permissible piston stroke from its position of balance. At the ends of the free-cut portions of the rod, forming the annular leak passages, transitional leak passages are formed by obliquely extending cuts in the end shoulders of the free-cut portions.

Further features and advantages of the device will appear from the ensuing description of one form of embodiment of a shock-absorber according to the invention, given merely by way of example and illustrated in the appended drawings, in which.

Figure 2:
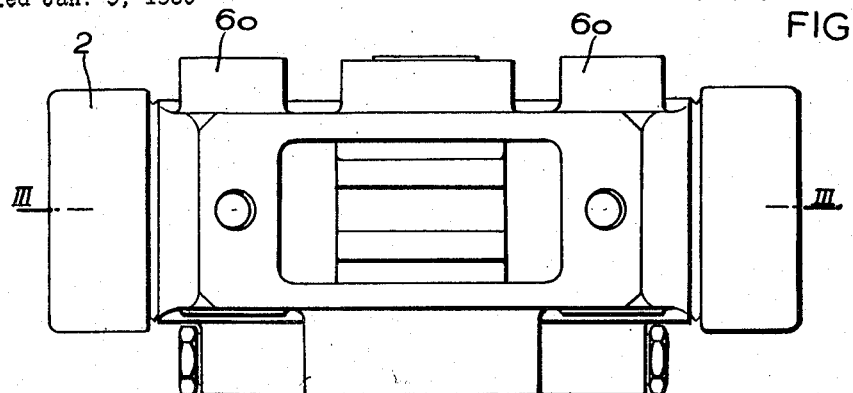
Figure 2 is a plan view, cover removed.
Figure 3:
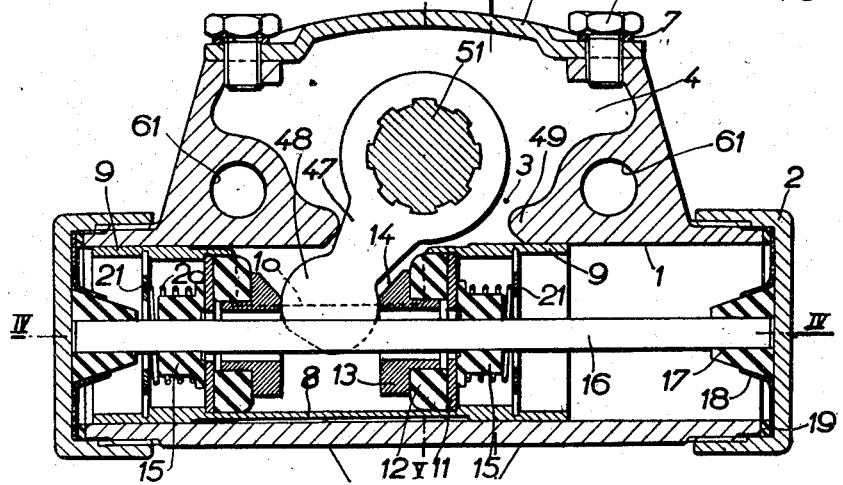
Figure 3 is a longitudinal vertical section on line III—III of Figure 2.
Figure 4:
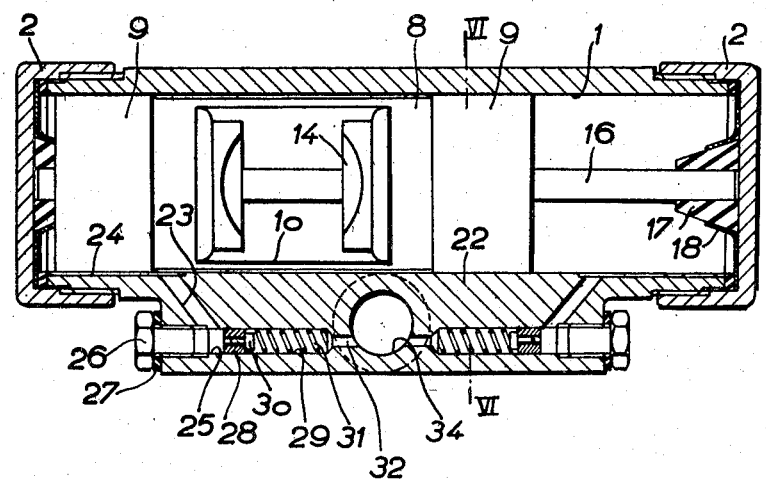
Figure 4 is a view in horizontal section on line
Figure 5:
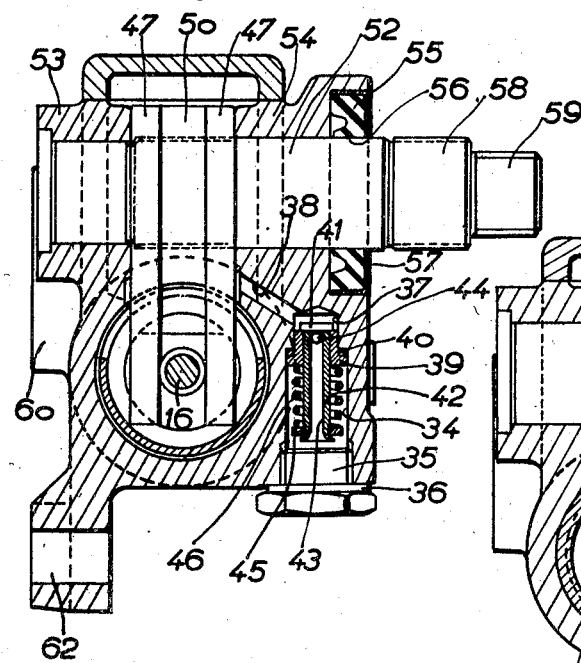
Figure 6:
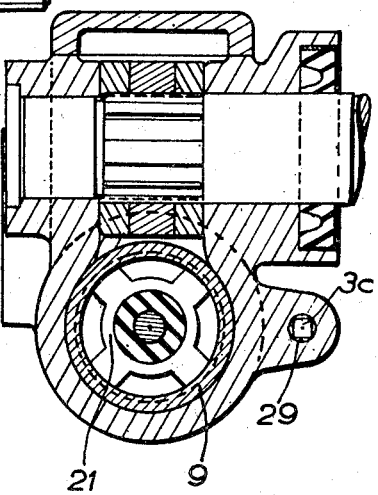
Figure 7:
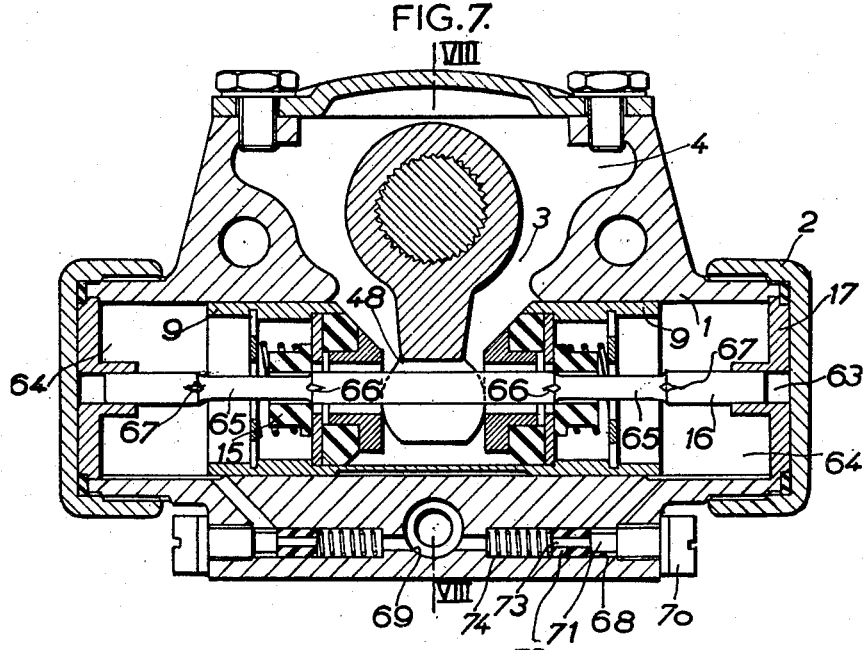
Figure 8:
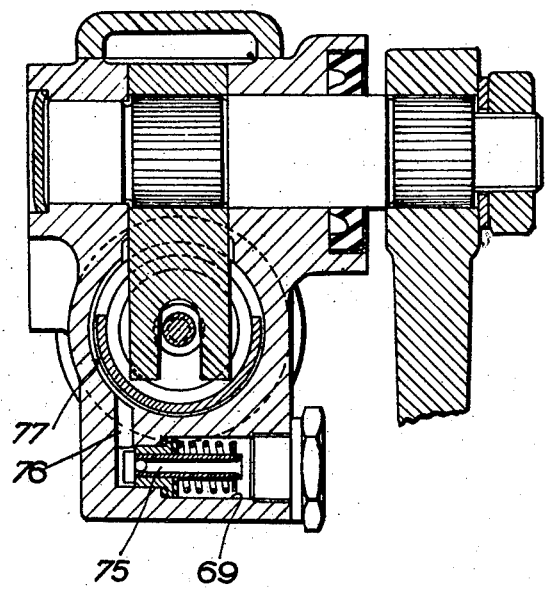

IV—IV of Fig. 3, the piston not being shown in section;

Figure 5 is a vertical section on line V—V of Fig. 3;

Figure 6 is a vertical section on line VI—VI of Figures 3 and 4;

Figure 7 is a vertical section of the shock-absorber through the axis of the cylinder, in a modified embodiment;

Figure 8 is a transverse section taken on line VIII—VIII of Figure 7.

Reference will first be had to Figures 1 to 6 of the drawings.

According to the exemplary embodiment selected and illustrated the shock-absorber body which is a casting, preferably of light metal (see Figs. 1 to 3), forms a cylinder 1, bored through from end to end, sealed at both its ends by screw plugs 2 and communicating through an open part 3 in its intermediate portion into an enlarged cavity 4 which is provided with a cover 5 retained by two screws 6 seated against synthetic rubber washers 7.

In the cylinder bore there is mounted a double-acting piston which, according to an essential feature of the invention, is constituted by a free-cut steel tube 8 provided with transverse partitions.

The external free-cut reduces the diameter of the intermediate or central portion and leaves at the ends two piston heads 9 sliding in the bore. On its side toward the opening 3, the tube 8 has at the midpoint of its length a wide cut-out 10 throughout almost half its diameter (also see Fig. 4). Both piston-heads 9 are symmetrically related to each other. To either side of said cut-out, the inner wall of the tube is bored over a short distance to receive a washer 11 forming a transverse partition. Against that face of said washer which is directed toward the cut-out, is applied a thick synthetic rubber washer 12 provided with a socket or bushing 13 formed with an obliquely-cut flat 14 toward the mouth of the opening 3.

Against the outer face of the washer 11 is applied a synthetic rubber intake-valve 15 centred on a rod 16 which traverses the piston from end to end and is mounted axially of the cylinder. The rod 16 is carried at each end in a long synthetic rubber boss 17 maintained against the end face of the plug 2 by a metal washer 18 surroundingly engaging its tapered contour and clamped by the plug against a synthetic rubber gasket 19 preventing leakage through the screw-threads. Each intake-valve 15 is applied against the partition 11 which serves as a seating therefor, by means of a spring 20 applied against a perforate washer 21 (also see Fig. 6) retained by lugs punched therein, within a circumferential groove of the piston 9.

The body is laterally enlarged with a cylindrical mass 22 having its axis parallel to the axis of the cylinder 1 and provided with a duct for the return of the liquid from both ends of the cylinder towards the reserve supply provided by the enlarged cavity 4. Said duct has two symmetrical branches and a common portion. Each branch of the duct (see Fig. 4) comprises an obliquely extending channel 23 which may be cast integrally and which extends from a recess 24 formed at the end of the cylinder bore to open into a bore in the cylindrical mass 22. Said bore which is formed in several steps of decreasing diameter, comprises at its outer end an enlarged portion 25 sealed by a screw-plug 26 provided with a gasket ring 27 of synthetic rubber. At the inner end of the enlarged portion 25 a metal ring 28 with a small central aperture is pressfitted. Against the internal face of this ring and in the next following intermediate portion 29 is seated a square block of synthetic rubber 30 (also see Fig. 6) forming a check-valve, applied against the ring serving as a seating therefor by means of a spring 31. The latter is confined in said portion 29 as a result of the positioning of the ring 28 and bears against the inner end of said intermediate portion and the corners of the square check-valve. The spring is one of low strength which enables the check-valve to be lifted for a small pressure; the valve merely serves the function of a check-valve. The innermost step of the bore is a short small-diameter hole 32 which opens into that part of the return duct which is common to both ends of the cylinder.

Figure 1:
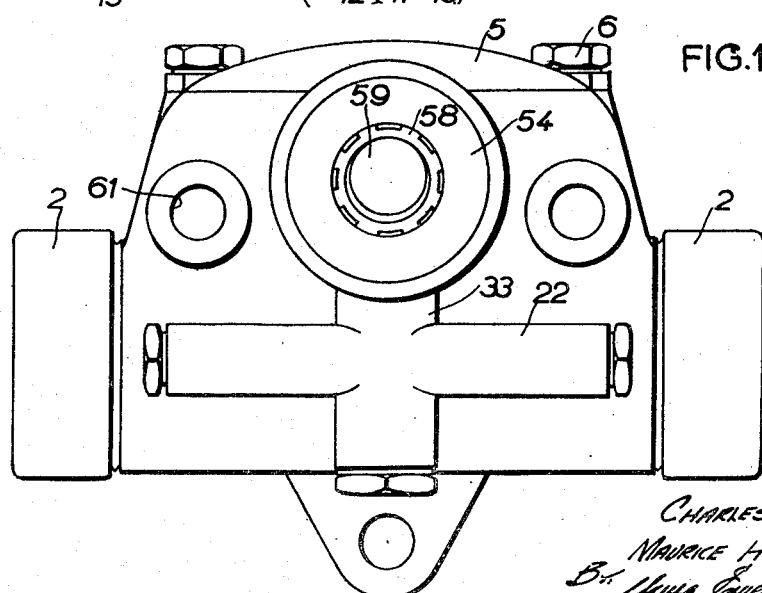
Figure 1 is a side elevational view of the shock-absorber.

Said common portion of the duct essentially comprises a vertical bore 34 in a cylindrical mass 33 of the body, perpendicular to the cylindrical mass 22 (see Figs. 1 and 5). Said bore 34 the outward opening of which is sealed by a screw plug 35 provided with a synthetic rubber gasket ring 36, contains a spring-loaded valve which constitutes the single return valve. The bore 34 is extended by a bore 37 of lesser diameter communicating with an integrally-cast channel 38 which opens into the enlarged cavity 4. In said bore 37 of smaller diameter is fitted a shouldered bushing or socket 39 whose shoulder is seated against a gasket ring 40 at the end of the larger diameter perforation. Said bushing is a hard fit with the valve, for which it serves as a seat. Said valve opens towards the channel 38 and comprises a head 41 resting against the smaller end of the bushing and a cylindrical shank 42 formed with a longitudinal hole 43 and a transverse hole 44 beneath the head 41. It is threaded at its other end and receives a crimped-on annular nut 45 which serves as a seat for a valve-spring 46 retained against said annular nut and the bushing 39.

Between both bushings 13 of the piston (Figs. 3 and 5) and on each side of the central rod 16 there is engaged a finger 47 having its end rounded as at 48 to control the displacements of the piston. Said fingers could be produced by milling a unitary element. They are limited in their displacements by beads 49 of the body defining the opening 3 while such displacement is made possible, as shown in Fig. 1, as a result of the flats provided on said bushings. The two identical parallel fingers are mounted with spacers 50 on a splined portion 51 of a shouldered spindle 52 rotatable in bosses 53 and 54 of the body, on an axis perpendicular to the cylinder. On one side, said spindle projects through a sealing gasket formed by a synthetic rubber ring 55, moulded so as to form a flexible annular flange 56 bearing against the spindle at its point of egress and retained in a metallic casing 57, which enables it to be pressfitted into a complementary recess of the body. The projecting part of the spindle presents a splined journal portion 58 and terminates in a threaded end 59 designed to receive a lock-nut for a connecting lever secured to the splined journal and controlling the shock-absorber.

On the opposite side the body comprises bearing bosses 60 corresponding with two bolt-holes 61 extending through it from end to end and a securing lug 62.

The operation is immediately comprehensible. In the reciprocating shock-absorbing movements, should the operating fingers which normally occupy a vertical position, slant towards the left of Fig. 3 to the position shown, the right-hand end of the cylinder becomes filled with liquid. The latter passes from the supply cavity 4 through the bushing 13 and the partition 11 which forms a seat for the intake check-valve 15, raises said check-valve and enters into the related end of the cylinder through the perforate disc 21. At the other end of the cylinder, the compressed liquid (see Fig. 4) escapes through the recess 24, the oblique channel 23 and the stepped bores 25, 29, 32, raising the check-valve 30, and enters into the bore 34 under the loaded valve (see Fig. 5). As soon as the pressure is sufficiently high, the said valve rises and the liquid passes through the channels 43, 44 of the valve to return to the supply 4 through the channel 38.

The advantages of the arrangements just described reside in its wear-resistance and safety in operation and its great simplicity of assembly.

As concerns resistance to wear, this is essentially due to the fact that, with the cylinder bored out in a lightweight metal body, the piston is formed by machining a highly resistant treated steel tube, the friction coefficient of which against the light metal is low. Moreover, the axial rod 16 for centering the intake valves 15 being mounted in synthetic rubber bosses and the valves themselves being made of synthetic rubber, no impacts between metals are to be feared. Said rod is not in contact with the piston. The movements of the latter is controlled by the fingers 47 without any play owing to the thrust from the resilient blocks formed by the bearing or seating washers 12 for the bushings 13, which provide a slight clamping action upon the rounded extremity 48 of said fingers. The symmetrical arrangement of the latter in two planes equidistant from the axis, insures a perfectly symmetrical action on the piston and the latter slides in the cylinder without any danger of jamming.

As for the simplicity of assembly, this is manifest. Machining the piston is reduced to a free-cutting operation, a single milling step being necessary to form the cut-out 10. The spring-seating washers 21 (Fig. 3) are put into position by means of a pressing operation which flattens out said washers, initially dished, to engage their lugs into the grooves provided therefor. The springs 20 and the intake valve 15, the bearing partitions 11, the resilient blocks 12 provided with their bushings 13, are inserted and positioned through the cut-out 10. In the same way, the check-valves 30 (Fig. 4) are very simple to mount. The spring 31 and valve 30 are inserted, and the ring 28 serving as a seat for it is press-fitted in. The loaded valve is put into place in a similar fashion by press-fitting the bush 39 in which said valve is mounted. Finally, the sealing gasket 55 for the control spindle is presented ready for assembly in its metal casing 57, which it is simply necessary to press-fit into the corresponding recess. After the piston has been mounted, the control fingers 47 are inserted into the body through the upper opening of the cavity 4, the cover 5 of which has been removed; they are then engaged into the piston and mounted on the control spindle by insertion of the latter.

In the alternative embodiment illustrated in Figures 7 and 8, the rod 16 supported at its ends by two centering parts blocked in the end of the cylinder bore by the plugs 2, is substantially shorter than the length of the cylinder and is freely mounted in said centering parts, so as to be capable of motion on both sides from its intermediate position. The small chamber 63 formed in the centering part at each end of the rod communicates through a metered leakage port with the chamber 64 defined by the piston at the corresponding end of the cylinder. Such leakage may, for example, simply result from a minute amount of clearance systematically provided between the rod and the centering part 17.

At the level of each piston head, the rod 16 presents a free-cut section 65 extending over a certain length towards the cylinder end from the bearing face of the intake valve, when the piston and rod occupy the intermediate position shown in Fig. 7. At the ends of said free-cut portion, cut-outs 66 and 67 having cross-sections tapering down in both directions further provide transition leakage ports.

Each cylinder end communicates, as described in the first exemplary embodiment, with a longitudinal perforation 68 communicating at its centre with a common return channel 69 leading to the supply. On either side of said channel, each branch perforation sealed by a screw-plug 70 formed with a pin 71, contains a sliding valve formed by a cylindrical part 72 having a central hole 73, applied against the pin 71 by a spring 74. The common return channel 69 contains the spring-loaded valve 75 which is the single return valve previously described with reference to Figs. 1–6 and opens through a channel 76 into a groove 77 in the central part of the bore so as to communicate with the supply 4.

The device operates as follows:

Assume the rod 16 is in its intermediate position, as well as the piston-controlling fingers 48, for the balanced condition of the suspension. A deflection of the springs will rotate the fingers 48 say clockwise, moving the piston toward the left of Fig. 1. Assume further that the amplitude of the reciprocation is restricted.

As soon as the piston departs from its position of balance the intake valve 15 is located fully above the free-cut section 66 of the rod and opens up an annular leakage duct, which prevents the pressure from building up at the left-hand end of the cylinder. No braking action is produced during the outward stroke, if the amplitude is insufficient for the left-hand face of the valve 15 to reach the end of the free-cut section 65. During this stroke the intake valve 15 of the right piston-head is raised, allowing the liquid to re-enter the chamber 64 at the right-hand end of the cylinder.

In the return movement of the piston toward the right, the left-hand intake valve 15 may remain seated, the liquid sucked in passing through the leak-way in the free-cut portion 65. Said leakway is shut down as the piston again passes through its position of balance, but the cut out 66 still permits of a reduced leakage, which avoids a sudden re-opening movement of the intake valve. In the chamber 64 of the right-hand end of the cylinder, on the other hand, the liquid pressure builds up from the very start of the return movement, up to a value corresponding to the loading of the return spring of valve 75, until the right-hand intake valve 15 passes over the right-hand free-cut section 65 of the rod at the time the piston crosses its equilibrium position. The pressure therefore again becomes zero during the outward stroke toward the right, as previously described, and will only re-assume a retarding value corresponding with the spring-loading on the return valve during the return stroke towards its position of equilibrium.

The pressure-variations at both ends of the cylinder do not at once make themselves felt in the little chambers 63 at the ends of the rod, since those chambers are only connected with the chambers 64 through metered leakage ports. On the other hand, the pressure which becomes established in any one of said chambers at the end of a certain lapse of time is a pressure which corresponds with the integral, over said time, of the pressure variations in the adjacent chamber 64.

When the position of balance of the suspension corresponds with the intermediate position of the piston shown in Fig. 7, the integrated pressures in both small end-chambers 63 are equal and the rod occupies the intermediate position shown.

Assume now that the balance position of the shock-absorber is varied, and undergoes say a displacement towards the left of Fig. 7, the rod 16 first remaining in its intermediate position shown. During the piston's outward strokes, as stated, the annular leakway prevents retardation and the latter will only occur during the return strokes which correspond to the displacement of one of the intake valves over the central full-diameter portion of the rod 16. Now the assumed leftward displacement of the equilibrium position increases the length of said displacement for the right-hand valve 15 and reduces it for the left-hand valve 15. It follows that the braking pressure persists a longer time in the right-hand than in the left-hand chamber 64.

The pressure in the small right-hand chamber 63 will therefore soon be higher than in the chamber 63 at the other end of the rod and will cause a displacement of the latter as far as a position symmetrical with respect to the new position of balance, this restoring similar conditions of symmetrical damping as in the event where the position of balance was the intermediate position shown in Fig. 1.

It will thus be seen that the rod 16 will of its own accord place itself in a position symmetrical to the equilibrium position wherever the latter may be.

As shown, the free-cut portions 65 are only provided with a length limited to a given distance from the ends of the cylinders. This arrangement is for the purpose of ensuring retardation at the end of the outward stroke, when, as a result of a violent shock, the suspension assumes a large displacement. Returning again to a description of the operation, it will be assumed, for example, that at the end of the piston's leftward outward stroke, the intake valve 15 at the left-hand side runs past the end of the lefthand freecut portion 65. The annular leakway is then sealed off and the pressure in the lefthand chamber 64 quickly rises to a value as given by the spring-loading of the return valve. A violent bumping of the suspension is thus avoided in the event of a brutal impact.

The cut-out 67 of the rod provided a transition between non-braking and braking, which averts a brutal stop of the displacement. At the beginning of the return stroke, it gradually promotes the leakage and avoids a brutal return of the intake valve 15 upon its seat, said valve rising as soon as the movement is initiated but dropping back again upon opening of the annular leakway.

The shock-absorber as just described therefore provides for a free deflection of the springs and only damps the back-to-balance return movements, thereby allowing the suspension to retain all of its flexibility, inasmuch as damping is only produced at the end of the high-amplitude deflection strokes in the event of violent shocks to prevent or restrict bumping. Its operation moreover is very smooth owing to the transitional leakage means, its assembly, as shown, is very economical, and the rod 16 may be prepared for its slide-valve function by a most simple machining step on said rod.

As will be understood, the invention is not limited to the shock-absorber illustrated and described, similar structural improvements being applicable to shock-absorbers of different design.

What we claim is:

1. A double-acting piston shock-absorber comprising in combination a body having a bore extending through the same forming a piston-receiving-cylinder, said body having a central cavity communicating with said cylinder intermediate the ends of said cylinder and serving as a liquid supply reservoir, a piston in said cylinder formed with heads adapted to slide in said cylinder on each side of said cavity, a shaft extending through said cavity in a direction transverse to the axis of said cylinder, an acting finger on said shaft engaging said piston, plugs sealing the external ends of said cylinder and forming end chambers in front of the piston heads, said heads having openings and valve means controlling the opening for intake of liquid from said central cavity to said end chambers, a return duct formed of two branches opening at the cylinder ends and a common part opening in said cavity, check-valves in said branches and a spring-loaded return valve in the common part of said duct.

2. A shock absorber according to claim 1, comprising further in combination for each branch of said return duct a bored portion, a screw plug sealing the external end thereof and formed with an internal projecting pin, a channel between the cylinder end and said bored portion opening laterally to said pin, a ring of resilient material sliding in said bored portion, and a spring urging said ring towards said pin in a closed position checking any return of liquid toward said cylinder end.

3. A shock-absorber according to claim 1, comprising further in combination for the common part of said return duct a bored portion, a screw-plug sealing the external end thereof, a channel between the bottom of said bored portion and said central cavity, a bushing press-fitted in said bored portion and opening into said channel, a valve formed with a head adapted to seat on the inner face of said bushing and a hollow shank slidable in said bushing and bored transversely beneath said head, a washer fixed on the end of said shank and a compression spring around said shank between said bushing and said washer.

4. A shock-absorber according to claim 1, comprising further in combination for the piston, a steel tube having a bored mid-portion forming end shoulders and a central wide cut-out over nearly half of its diameter between end portions forming heads of said piston, perforated partitions with peripheral lugs engaging an internal groove of said heads, washers against said shoulders in the bore mid-portion, block of resilient material forming in each head an intake-valve seating against said washer, a spring between said perforated partition and said valve thick rings of resilient material against said washers in said bored mid-portion, bushings mounted on said rings, and said acting finger being formed with a rounded end clamped between said bushings.

5. A double-acting piston shock-absorber, comprising in combination, a body having a bore extending through the same forming a piston receiving-cylinder, said body having a central cavity communicating with said cylinder intermediate the ends of said cylinder and serving as a liquid supply reservoir, a shaft extending through said cavity in a direction transverse to the axis of said cylinder, plugs sealing the external ends of said cylinder, an axial rod supported at both ends by said plugs, a piston including a steel tube having a central wide cut-out between end portions forming piston heads, an inner partition with a central opening around said rod in each head, an outer perforated partition around said rod, an intake valve formed of a block of resilient material sliding on said rod and urged to seat on the inner partition by a spring abutted against said outer partition, a finger mounted on said shaft and formed with a rounded slotted end engaged in said cut-out central part of the piston resiliently clamped between said inner partitions, a return duct branched to the cylinder ends and valve means in said duct for communication only from either the one or the other cylinder end to the central cavity.

6. A shock-absorber according to claim 5 in which said rod is formed with recessed portions providing leakways through said intake-valves during given portions of the piston stroke.

7. A shock-absorber according to claim 5, comprising further in combination, axial bored extensions from the inner face of the cylinder plugs receiving the ends of said rod, said rod being shorter than the cylinder to slide in said extensions forming small cylinders in communication with the main cylinder through metered leakports, and recessed portions in said rod having tapering ends for leak-passages for the liquid through the intake valve during the main part of the piston stroke from its position of balance.

8. In a shock absorber, in combination, a body having a bore extending through the same forming a piston-receiving-cylinder, said body having a central cavity communicating with said cylinder intermediate the ends of said cylinder and serving as a liquid supply reservoir, a piston formed with heads, means closing the external ends of said cylinder and forming end chambers in said cylinder in front of said piston heads, a longitudinal rod in said cylinder extending through said piston, intake valves in said heads mounted to slide on said rod and having recessed portions providing leakways through said intake valves during given portions of the piston stroke.

9. In a shock absorber, further to the combination claimed in claim 8, end pieces in said cylinder forming for said rod small cylinders in communication with the main cylinder through metered leakports, said rod being adapted to slide longitudinally according to the mean pressure of liquid in said small cylinders whereby it may adapt its position to the position of balance of the piston.

CHARLES GRANET.
MAURICE HELBIG.

References Cited in the file of this patent
UNITED STATES PATENTS

| Number | Name | Date |
| --- | --- | --- |
| 1,828,357 | Chryst | Oct. 20, 1931 |
| 2,079,771 | Rossman | May 11, 1937 |